United States Patent
Oh et al.

(10) Patent No.: US 11,824,208 B2
(45) Date of Patent: *Nov. 21, 2023

(54) INTERMETALLIC CATALYST AND METHOD FOR PREPARING THE SAME

(71) Applicants: Hyundai Motor Company, Seoul (KR); Kia Corporation, Seoul (KR)

(72) Inventors: Songi Oh, Gyeonggi-do (KR); Jee Youn Hwang, Seoul (KR); Dahee Kwak, Gyeonggi-do (KR); Ji-Hoon Jang, Gyeonggi-do (KR); Eunjik Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 17/347,836

(22) Filed: Jun. 15, 2021

(65) Prior Publication Data
US 2022/0231306 A1 Jul. 21, 2022

(30) Foreign Application Priority Data
Jan. 15, 2021 (KR) .................. 10-2021-0005700

(51) Int. Cl.
| | | |
|---|---|---|
| *B01J 21/18* | (2006.01) | |
| *B01J 23/16* | (2006.01) | |
| *B01J 23/20* | (2006.01) | |
| *B01J 23/22* | (2006.01) | |
| *B01J 23/26* | (2006.01) | |
| *B01J 23/34* | (2006.01) | |
| *B01J 23/40* | (2006.01) | |
| *B01J 23/42* | (2006.01) | |
| *B01J 23/44* | (2006.01) | |

(Continued)

(52) U.S. Cl.
CPC .................................. *H01M 4/921* (2013.01)

(58) Field of Classification Search
CPC ........ B01J 21/063; B01J 21/066; B01J 21/18; B01J 21/185; B01J 23/40; B01J 23/42; B01J 23/44; B01J 23/46; B01J 23/60; B01J 23/626; B01J 23/63; B01J 23/6482; B01J 23/6484; B01J 23/6522; B01J 23/6562; B01J 23/8906; B01J 23/8913; B01J 23/892; B01J 23/8926; B01J 23/894; B01J 23/8953; B01J 23/8966; B01J 23/898; B01J 23/8986; B01J 23/8993; B01J 37/343; H01M 4/921
USPC ........ 502/182–185, 324, 326, 332–339, 344, 502/349–351
See application file for complete search history.

(56) References Cited

U.S. PATENT DOCUMENTS 6,956,005 B2 * 10/2005 Leiber ................... C07F 9/3813
502/185
7,022,642 B2 * 4/2006 Yamamoto ............. B82Y 30/00
502/185

(Continued)

*Primary Examiner* — Cam N. Nguyen
(74) *Attorney, Agent, or Firm* — Fox Rothschild LLP

(57) ABSTRACT

Provided is a method of preparing an intermetallic catalyst. The method includes form core-shell particles including a transition metal oxide coating layer by irradiating ultrasonic waves to a precursor mixture solution including a noble metal precursor, a transition metal precursor, and a carrier to; forming intermetallic particles including a transition metal oxide coating layer by annealing the core-shell particles; and removing the transition metal oxide coating layer from the intermetallic particles.

14 Claims, 14 Drawing Sheets

(51) Int. Cl.
  *B01J 23/46* (2006.01)
  *B01J 23/54* (2006.01)
  *B01J 23/60* (2006.01)
  *B01J 23/62* (2006.01)
  *B01J 23/64* (2006.01)
  *B01J 23/72* (2006.01)
  *B01J 23/74* (2006.01)
  *B01J 23/745* (2006.01)
  *B01J 23/75* (2006.01)
  *B01J 23/755* (2006.01)
  *B01J 23/80* (2006.01)
  *B01J 23/835* (2006.01)
  *B01J 23/84* (2006.01)
  *B01J 23/847* (2006.01)
  *B01J 23/86* (2006.01)
  *B01J 23/89* (2006.01)
  *B01J 37/34* (2006.01)
  *H01M 4/92* (2006.01)

(56) References Cited

U.S. PATENT DOCUMENTS

| | | | | |
|---|---|---|---|---|
| 7,193,107 B2* | 3/2007 | Leiber | ............. | B01J 23/56 562/17 |
| 7,291,751 B2* | 11/2007 | Leiber | ............. | C07F 9/3813 562/17 |
| 7,968,191 B2* | 6/2011 | Hampden-Smith | .... | G01N 33/58 428/408 |
| 8,163,263 B2* | 4/2012 | Harutyunyan | ......... | B01J 37/343 977/843 |
| 8,168,561 B2* | 5/2012 | Virkar | ............. | B01J 35/008 502/336 |
| 8,871,672 B2* | 10/2014 | Goto | ............. | H01M 4/925 429/525 |
| 9,163,041 B2* | 10/2015 | Wan | ............. | B01J 23/70 |
| 9,385,377 B2* | 7/2016 | Kaneko | ............. | H01M 4/921 |
| 9,735,432 B2* | 8/2017 | Cho | ............. | H01M 4/8825 |
| 9,755,243 B2* | 9/2017 | Mashio | ............. | B01J 23/42 |
| 9,873,107 B2* | 1/2018 | Hass | ............. | B01J 23/63 |
| 9,944,667 B2* | 4/2018 | Wan | ............. | B01J 23/8906 |
| 10,135,074 B2* | 11/2018 | Takahashi | ............. | H01M 4/9083 |
| 10,537,880 B2* | 1/2020 | Cho | ............. | B01J 35/008 |
| 10,562,018 B2* | 2/2020 | Suzue | ............. | B01J 35/1028 |
| 10,675,611 B2* | 6/2020 | Okui | ............. | B01J 35/10 |
| 10,686,196 B2* | 6/2020 | Arihara | ............. | H01M 4/92 |
| 10,868,312 B2* | 12/2020 | Cho | ............. | H01M 4/926 |
| 10,991,950 B2* | 4/2021 | Abruña | ............. | H01M 4/921 |
| 11,014,074 B2* | 5/2021 | Kishimoto | ............. | H01M 4/90 |
| 11,127,956 B2* | 9/2021 | Mukherjee | ............. | H01M 4/921 |
| 11,224,859 B2* | 1/2022 | Rong | ............. | B22F 3/1143 |
| 11,426,712 B2* | 8/2022 | Zhang | ............. | B01J 23/889 |
| 2002/0009626 A1* | 1/2002 | Terazono | ............. | B01J 35/0033 429/535 |
| 2006/0196310 A1* | 9/2006 | Toshima | ............. | B01J 23/40 428/407 |
| 2011/0275009 A1* | 11/2011 | Goto | ............. | B01J 23/75 429/506 |
| 2012/0321996 A1* | 12/2012 | Ito | ............. | H01M 4/8657 429/525 |
| 2015/0231598 A1* | 8/2015 | Zhao | ............. | B01J 20/3293 502/406 |
| 2016/0197358 A1* | 7/2016 | Arihara | ............. | H01M 4/926 502/185 |
| 2017/0200956 A1* | 7/2017 | Nagami | ............. | H01M 4/926 |
| 2018/0006313 A1* | 1/2018 | Haas | ............. | H01M 4/921 |
| 2019/0103613 A1* | 4/2019 | Tsuchida | ............. | H01M 4/8807 |
| 2021/0036334 A1* | 2/2021 | Kon | ............. | H01M 4/8668 |
| 2021/0170369 A1* | 6/2021 | Jiang | ............. | B01J 35/1038 |

* cited by examiner

INTERMETALLIC CATALYST AND METHOD FOR PREPARING THE SAME

CROSS-REFERENCE TO RELATED APPLICATION

This application claims priority to and the benefit of Korean Patent Application No. 10-2021-0005700 filed in the Korean Intellectual Property Office on Jan. 15, 2021, the entire contents of which are incorporated herein by reference.

TECHNICAL FIELD

The present invention relates to an intermetallic catalyst for a fuel cell and a method for preparing the same.

BACKGROUND

A fuel cell is an energy conversion device that directly converts chemical energy of a fuel into electrical energy. The fuel cell has superior efficiency compared with existing internal combustion engines, and is in the spotlight as a next-generation energy source due to its high energy density and environment-friendliness.

Polyelectrolyte fuel cells (PEMFC) and direct methanol fuel cells (DMFC) mainly operate at a low temperature of less than or equal to about 80° C., and thus an electrode catalyst is required to increase rates of oxidation and reduction reactions of the fuel cell. In particular, platinum is mainly used as an electrode catalyst for a fuel cell because it is the only catalyst capable of promoting oxidation of fuel (hydrogen or alcohol) and reduction of oxygen from room temperature to about 100° C. However, since platinum reserves are limited and very expensive, it is very important to reduce the amount of platinum used or maximize catalytic activity per unit mass for commercialization of fuel cells.

In order to achieve the above object, studies on platinum alloy catalysts are being conducted. Platinum alloy catalysts theoretically have higher activity and stability than pure platinum catalysts due to electrical and structural characteristics of the particle surface, and thus are attracting attention as a reliable alternative to fuel cell electrode materials.

Generally, a platinum alloy catalyst is prepared by depositing a transition metal precursor with a start material of a platinum catalyst and annealing the same at a temperature of 700° C. to 1200° C. using a gaseous reducing agent such as hydrogen. However, such a high-temperature annealing process may increase a size of an alloy particle, thereby reducing a catalytic activity.

Accordingly, in the related art, it has been researched to provide a method of preparing an alloy catalyst without a high-temperature annealing process such as a chemical reduction process, a carbonyl complex process, a microemulsion process, and a polyol process. However, the alloy catalyst prepared by above methods has problems that a significant amount of the transition metal is present on the surface of the particle without forming an alloy, and is easily melted during operation of the fuel cell, thereby reducing durability as well as catalytic activity.

Therefore, in order to prepare an alloy catalyst that satisfies high catalytic activity and durability for use as a fuel cell catalyst, it is required to solve problems of degrading performance and durability caused by eluting the metal components and coarsening particles.

SUMMARY OF THE INVENTION

In preferred aspects, provided is a method of preparing an intermetallic catalyst being capable of improving catalyst performance and durability by maximizing a ratio of maintaining an ordered atomic arrangement of intermetallic particles and controlling a crystalline degree of individual particles to suppress eluting metallic components of the alloy catalyst and coarsening particles.

In an aspect, provided is a method of preparing an intermetallic catalyst includes forming core-shell particles including a transition metal oxide coating layer; forming intermetallic particles including a transition metal oxide coating layer by annealing the core-shell particles; and removing the transition metal oxide coating layer from the intermetallic particles.

The term "intermetallic compound" or "intermetallic alloy" as used herein generally refers to a metal compound or metal alloy compound that has a specific chemical formula formed by ionic or covalent bonding and includes the metals (e.g., metal atoms) fixed or very limited in variability. In certain preferred aspects, an intermetallic compound or intermetallic alloy may forms a specific crystal structure, for example, by placing a specific single element in the specific position in the crystal structure such that those intermetallic compounds can have high melting point, or resistance to high temperatures but low ductility. In certain aspects, such property can be distinct from conventional (or non-intermetallic) metal alloys, which may be formed from disordered solid solution of one or more metallic elements, and do not have a specific chemical formula or crystal structure. Exemplary intermetallic compound or alloy may include one or more metals selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), and an alloy thereof.

Preferably, the core-shell particles may be formed by irradiating ultrasonic waves to a precursor mixture solution including a noble metal precursor, a transition metal precursor, and a carrier.

Preferably, the annealing may be performed at a temperature of about 800° C. to about 1400° C.

The annealing may be performed for about 2 hours to about 10 hours.

The core-shell particles may include a transition metal core, a noble metal shell surrounding the transition metal core, and a transition metal oxide coating layer surrounding the noble metal shell.

The transition metal oxide coating layer may include $Fe_2O_3$.

A thickness of the transition metal oxide coating layer may be about 0.2 nm to about 0.88 nm.

The irradiating of the ultrasonic waves may be performed for about 20 minutes to about 4 hours at an output of about 125 W to about 200 W based on 100 mL of the precursor mixture solution.

The annealing may be performed under a mixed gas including hydrogen ($H_2$) and argon (Ar), and the mixed gas may include hydrogen ($H_2$) in an amount of about 1 volume % to about 10 volume % based on a total volume of the mixed gas.

The removing of the transition metal oxide coating layer from the intermetallic particles may be performed by acid treatment.

The acid treatment may be performed at a temperature of about 60° C. to about 94° C. for about 2 hours to about 4 hours.

The acid used for the acid treatment may include $HClO_4$, $HNO_3$, HCl, or a combination thereof.

A concentration of the acid may be about 0.01 M to about 1.0 M.

The intermetallic catalyst may include an intermetallic core of a transition metal and a noble metal, and a noble metal skin layer surrounding the intermetallic core.

The intermetallic core may have a degree of ordering of atomic arrangement of greater than or equal to about 58%.

The method of preparing an intermetallic catalyst according to various exemplary embodiments as described herein may improve catalyst performance and durability by maximizing a ratio of maintaining the ordered atomic arrangement of intermetallic particles and controlling a crystalline degree of individual particles to suppress eluting the metal component and coarsening particles.

Other aspects of the invention are disclosed infra.

DETAILED DESCRIPTION

Figure 1:
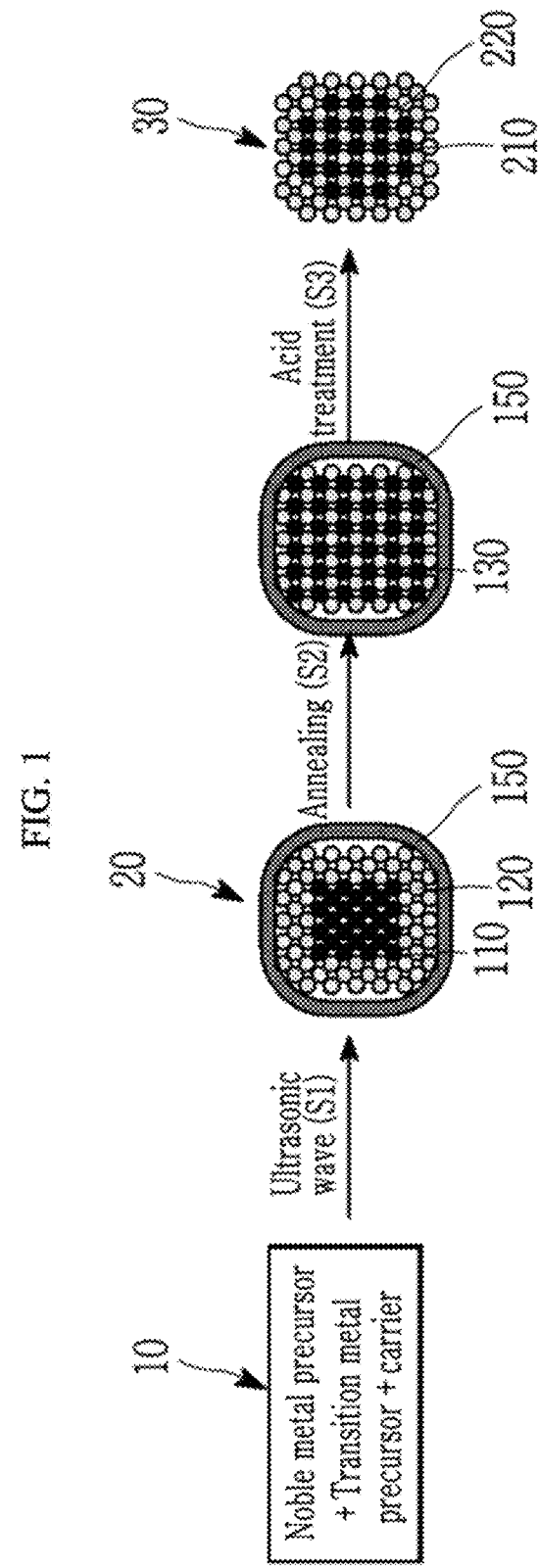
FIG. 1 shows an exemplary method of preparing an exemplary intermetallic catalyst according to an exemplary embodiment of the present invention.

The advantages and features of the present disclosure and the methods for accomplishing the same will be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined. In addition, unless explicitly described to the contrary, the word "comprise", and variations such as "comprises" or "comprising," will be understood to imply the inclusion of stated elements but not the exclusion of any other elements.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Further, the singular includes the plural unless mentioned otherwise.

A method of preparing an intermetallic catalyst includes irradiating ultrasonic waves to a precursor mixture solution to form core-shell particles including a transition metal oxide coating layer, annealing the core-shell particles to form intermetallic particles including a transition metal oxide coating layer, and removing the transition metal oxide coating layer from the intermetallic particles.

FIG. 1 shows an exemplary method of preparing an intermetallic catalyst according to an exemplary embodiment of the present invention. As shown in FIG. 1, a method of preparing an intermetallic catalyst is described.

The core-shell particles 20 including the transition metal oxide coating layer 150 are formed by irradiating ultrasonic waves to the precursor mixture solution 10 including the noble metal precursor, the transition metal precursor, and the carrier (S1).

High frequency oscillation of the ultrasonic waves generates bubbles in a cavity, resulting in oscillatory growth, and when the oscillation finally reaches a certain scale, the cavity explodes. This series of processes caused by the ultrasonic irradiation is called to be "an acoustics cavitation mechanism."

The cavity explosion occurring in the final stage of the acoustics cavitation mechanism may cause a huge amount of thermal energy up to about 5000 K, which is dissipated in a very short time of about $10^{-6}$ seconds.

When reactants in the chemical reaction combined with ultrasonic irradiation are at least two materials having different vapor pressures, the at least two reactants have different evaporation rates to bubbles by a high frequency oscillation of ultrasonic waves, so that structural and electrochemical characteristics of the reaction resultants may be controlled using the same. For example, when nanoparticles including at least two metals are prepared by using a noble metal precursor and a transition metal precursor as reactants and irradiating the same with ultrasonic waves, distributions of the noble metal and the transition metal elements in nanoparticles may be controlled according to a vapor pressure difference of the noble metal precursor and the transition metal precursor.

For example, in the nanoparticles, the noble metal having a low vapor pressure may be disposed in shell portions, and the transition metal having a high vapor pressure may be disposed in core portions, forming core-shell particles 20.

The irradiating of the ultrasonic waves may be performed for about 20 minutes to about 4 hours at an output of about 125 W to about 200 W based on 100 mL of the precursor mixture solution 10. When the irradiating of the ultrasonic waves is performed at an output of less than about 125 W or for a time of less than about 20 minutes, metal ions may be insufficiently reduced; while when at greater than about 200 W or for greater than about 4 hours, they may be grown to an unnecessary particle size.

The noble metal may include platinum (Pt), ruthenium (Ru), osmium (Os), iridium (Ir), palladium (Pd), an alloy thereof, or a mixture thereof. The noble metal precursor may include those having a lower vapor pressure than the vapor pressure of the transition metal precursor and contributing to a galvanic substitution reaction after forming transition metal seed particles and enlarging the sizes thereof. For example, the noble metal precursor may be in a form of a noble metal salt, and may include a nitrate, a sulfate, an acetate, a chloride, an oxide, or a combination thereof. Preferably, the noble metal precursor may be an acetyl acetonate of the noble metal, a hexafluoroacetyl acetonate of the noble metal, or a pentafluoroacetyl acetonate of the noble metal.

The transition metal may be cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), an alloy thereof, or a mixture thereof.

The transition metal precursor may be in a form of salts of the transition metal, and may include, for example, a nitrate, a sulfate, an acetate, a chloride, an oxide, or a combination thereof. Preferably, the transition metal precursor may be an acetyl acetonate of the transition metal, a hexafluoroacetyl acetonate of the transition metal, or a pentafluoroacetyl acetonate of the transition metal.

The transition metal precursor is rapidly volatilized by a high vapor pressure and rapidly captured in a cavity by the ultrasonic waves, so the transition metal may be disposed in a core portion in the core-shell particles 20.

The carrier may be a carbon carrier, for example, carbon black, graphite, carbon nanofiber, a graphitized carbon nanofiber, a carbon nanotube, a carbon nanohorn, a carbon nanowire, or a combination thereof. The carbon black may include denka black, ketjen black, acetylene black, channel black, furnace black, lamp black, thermal black, or a combination thereof.

The precursor mixture solution 10 may further include a reducing solvent.

The reducing solvent may include an organic material having no moisture or oxygen source, for example, a solvent having a reducing power at a temperature of greater than or equal to about 70° C. or a solvent having a reducing power at a temperature of about 70° C. to about 400° C. Preferably, the reducing solvent includes ethylene glycol, di-ethylene glycol, tri-ethylene glycol, poly-ethylene glycol, glycerol, or a combination thereof.

The reducing solvent plays a role of reducing reactants of a noble metal precursor and a transition metal precursor in a cavity formed by the ultrasonic treatment, and also, maintaining a high boiling point to create an external liquid environment for generating and extinguishing a cavity.

Meanwhile, on the surface of the core-shell particles 20 formed by the ultrasonic treatment, a transition metal oxide coating layer 150 surrounding a noble metal shell 120 may be included.

The transition metal oxide coating layer 150 may be formed by insufficient solubility of a transition metal into a platinum lattice, a difference of the reduction rates, and a component ratio of an excessive amount of a transition metal during the ultrasonic treatment.

The transition metal oxide coating layer 150 may have a thickness of about 0.2 nm to about 0.88 nm. When the thickness of the transition metal oxide coating layer 150 is less than about 0.2 nm, the transition metal oxide coating layer 150 may be formed in a non-uniform and thin thickness, so that the particle size may not be well controlled; while when the thickness is greater than about 0.88 nm, a crystalline transition metal oxide is generated after the annealing process, leaving residues.

The transition metal oxide coating layer 150 is derived from the transition metal precursor as in the transition metal core 110, so the transition metal included in the transition metal oxide coating layer 150 may be same as the transition metal included in the transition metal core 110.

For example, the transition metal oxide coating layer 150 may include $Fe_2O_3$. As $Fe_2O_3$ has thermal conductivity of about 20% compared to the case including no transition metal oxide coating layer 150 or the case that the transition metal oxide coating layer 150 includes MgO (i.e., thermal conductivity of MgO: 35 W/m·K, thermal conductivity of $Fe_2O_3$: 7 W/m·K), a difference of the effective heat transfer rates may occur, thereby, an intermetallic ratio may be increased without generating an order-disorder transformation when employing the same even at a high-temperature annealing.

The method of preparing an intermetallic catalyst 30 according to an embodiment provides core-shell particles 20 including a transition metal oxide coating layer 150 in one process using the ultrasonic treatment, so that the process may be simplified to save the cost.

Then the core-shell particles 20 are annealed to provide intermetallic particles including a transition metal oxide coating layer 150 (S2).

Atoms of the noble metal and the transition metal are regularly arranged through the annealing process, and a ratio of the transition metal core 110 is decreased to prepare intermetallic particles 130. The intermetallic particles are an alloy of a noble metal and a transition metal, which is an intermetallic alloy in which the noble metal atom and the transition metal atom are regularly arranged.

As the particle growth is suppressed by the transition metal oxide coating layer 150, the size of the intermetallic particles 130 may be controlled to be a size of several nanometers during the annealing process, so the metal atoms in the alloy may be regularly arranged by performing the annealing at a sufficiently high temperature to enhance uniformity of the composition and catalytic activity. In addition, when the transition metal oxide coating layer 150 includes $Fe_2O_3$ as in the above, the intermetallic ratio may be enhanced without having an order-disorder transformation from occurring even in the annealing at a high temperature by an effective heat transfer rate that is different from the conventional.

The annealing process may be performed at about 800° C. to about 1400° C. for about 2 hours to about 10 hours. When the annealing temperature is less than about 800° C. or the annealing time is less than about 2 hours, an increase in catalytic activity may be limited due to the lack of improvement in the regular arrangement of metal atoms in the alloy. When the annealing temperature is greater than about 1400° C. or the annealing time is greater than about 10 hours, an effect of inhibiting particle size growth may decrease, resulting in decreased catalytic activity.

The annealing process may be performed in an inert gas atmosphere such as argon, nitrogen, or a mixed gas atmosphere of an inert gas and hydrogen ($H_2$), and an atmosphere including about 1 volume % to about 10 volume % of hydrogen based on a total volume of the mixed gas.

Finally, the transition metal oxide coating layer 150 is removed from the intermetallic particles 130 (S3).

The removing of the transition metal oxide coating layer 150 in the intermetallic particles 130 may be performed by acid treatment.

The acid used for the acid treatment may include $HClO_4$, $HNO_3$, HCl, or a combination thereof.

A concentration of the acid may be about 0.01 M to about 1.0 M. When the concentration of the acid is less than about 0.01 M, it is insufficiently etched, and the acid treatment time may be lengthened, while when the concentration of the acid is greater than about 1.0 M, platinum may be dissolved together.

The acid treatment may be performed at a temperature of about 60° C. to about 94° C. for about 2 hours to about 4 hours. When the acid treatment temperature is less than about 60° C. or the acid treatment time is less than 2 hours, etching may be insufficient. When the acid treatment temperature is greater than about 94° C., a boiling phenomenon in the container may be severe even if refluxed, causing safety problems, and when the acid treatment time is greater than about 4 hours, there is no change in the transition metal content, which may waste process time and cost.

The intermetallic catalyst 30 may include an intermetallic core 210 of a transition metal and a noble metal, and a noble metal skin layer 220 surrounding the intermetallic core 210.

According to the method of preparing an intermetallic catalyst 30, since the core-shell particles 20 formed by being irradiated with the ultrasonic waves include a transition metal in the core, the intermetallic catalyst 30 obtained by performing the same with the annealing process includes noble metal particles exposed on the outer surface of the catalyst to provide a noble metal skin layer 220 in which the noble metal particles are dispersed with a high density on the surface of the intermetallic catalyst 30.

In general, since a slurry preparation process for electrode formation proceeds at a pH of less than or equal to about 1, and the fuel cell is operated in an acidic atmosphere, the transition metals in the alloy catalyst may be easily eluted, and the eluted transition metals enter the ion exchange membrane to increase the membrane resistance. As a result, deterioration of the fuel cell performance may be caused.

However, the intermetallic catalyst 30 obtained by the method of preparing an intermetallic catalyst further improves a bonding energy between the transition metal-noble metal by providing the transition metal-noble metal alloy with a degree of ordering as well as including a noble metal skin layer 220 on the surface, so that it may suppress eluting of the transition metal to solve the deterioration problems of the fuel cell performance.

A thickness of the noble metal skin layer 220 may be less than or equal to about 0.5 nm, or may be about 0.2 nm to about 0.5 nm. When the thickness of the noble metal skin layer 220 is greater than about 0.5 nm, it has a surface structure similar to that of the existing platinum catalyst, and thus the effect of improving performance due to alloying may be lost.

In the intermetallic catalyst 30, the atomic ratio of the noble metal and the transition metal may be about 1:0.2 to about 1:0.6. When the atomic ratio of the transition metal is less than about 0.2, formation of the intermetallic structure may be insufficient, and when it is greater than about 0.6, the thickness of the noble metal skin layer 220 may be insufficient.

A particle diameter of the intermetallic catalyst 30 may be about 3.5 nm to about 20 nm. When the particle diameter of the intermetallic catalyst 30 is less than about 3.5 nm, ordering of the atomic arrangement may be insufficient, while when it is greater than about 20 nm, it may be insufficient to secure an electrochemical specific surface area.

The intermetallic core may have a degree of ordering of the atomic arrangement of greater than or equal to about 58%, for example about 58% to about 99%. When the degree of ordering of the atomic arrangement of the intermetallic core is less than about 58%, performance and durability of the fuel cell may be reduced due to elution of transition metals.

In an aspect, provided is an electrode for a fuel cell, including the intermetallic catalyst 30 and an ionomer mixed with the intermetallic catalyst 30.

Further provided is a membrane-electrode assembly including an anode and a cathode facing each other, and an ion exchange membrane between the anode and cathode, wherein the anode, the cathode, or both are the aforementioned electrodes.

Also provided is a fuel cell including the aforementioned membrane-electrode assembly.

The electrode, the membrane-electrode assembly, and the fuel cell are the same as those of the general electrode, the membrane-electrode assembly, and the fuel cell, except that the aforementioned ternary alloy catalyst 30 is included, so detailed descriptions thereof will be omitted.

EXAMPLE

Hereinafter, specific examples of the invention are described. However, the examples described below are for illustrative purposes only, and the scope of the invention is not limited thereto.

Preparation Example: Preparation of Intermetallic Catalyst

Example $Pt(acac)_2$, $Fe(acac)_3$, and a porous carbon carrier (Vulcan XC72) were added into ethylene glycol to prepare a precursor mixture solution, and 100 mL of the precursor mixture solution was irradiated with ultrasonic waves using tip-type ultrasonic waves (Sonic and Materials, model VC-500, amplitude 30%, 13 mm solidprobe, 20 kHz) under an argon atmosphere at output of 150 W for 3 hours to provide core-shell particles including a transition metal oxide coating layer.

At this time, the addition amounts of the noble metal precursor and the transition metal precursor were adjusted so that an atomic ratio of the noble metal and the transition metal may be 1:1.5.

The prepared core-shell particles were annealed under a $H_2/Ar$ mixed gas atmosphere to provide intermetallic particles including a transition metal oxide coating layer. At this time, the annealing temperature was varied to a temperature of 800° C., 1000° C., 1200° C., and 1400° C., and the annealing time was changed to 2 hours, 6 hours, and 10 hours.

The intermetallic particles were treated with an acid of 0.1 M $HClO_4$ and an ethanol mixture solution at a temperature of 94° C. for 4 hours to prepare an intermetallic catalyst.

Comparative Example

An intermetallic catalyst was prepared according to the generally-used polyol synthesizing method without introducing the transition metal oxide coating layer.

Specifically, $Pt(acac)_2$, $Fe(acac)_3$, and a porous carbon carrier (Vulcan XC72) were added into ethylene glycol to prepare a precursor mixture solution and annealed at each temperature of 600° C., 650° C., 675° C., 715° C., 750° C., and 825° C. to prepare an intermetallic catalyst.

Figure 2:
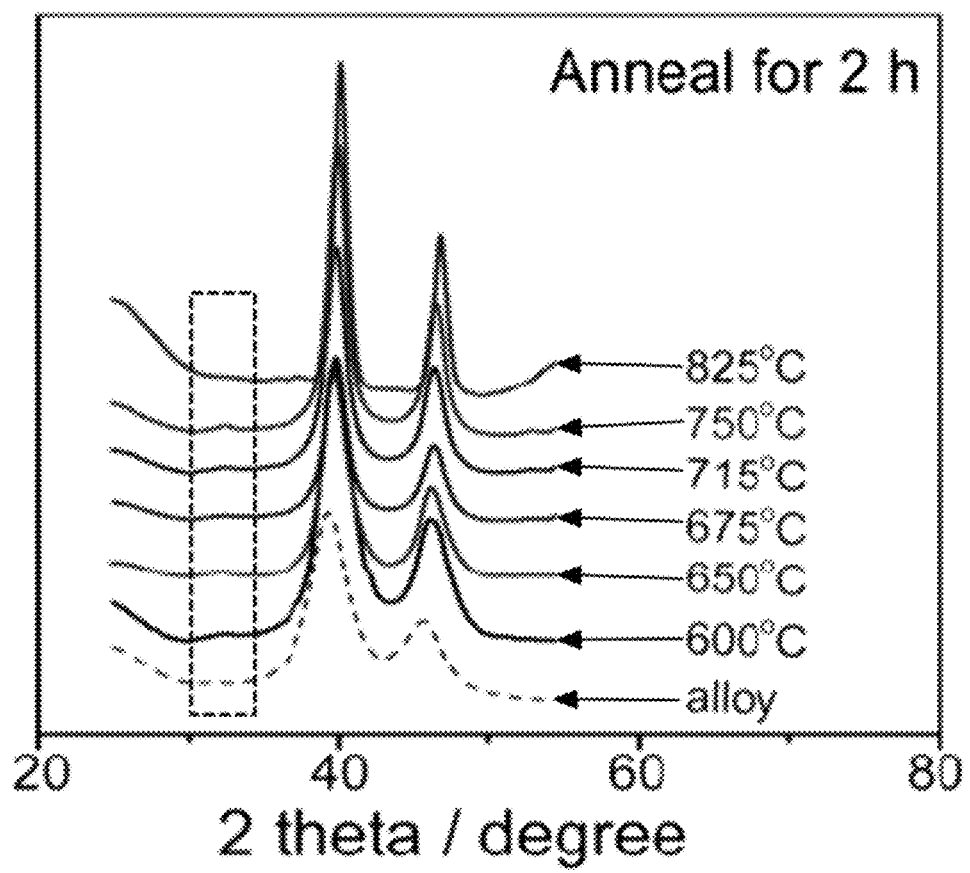
FIG. 2 shows in-situ XRD analysis results of the intermetallic catalyst prepared in comparative example.
Figure 3:
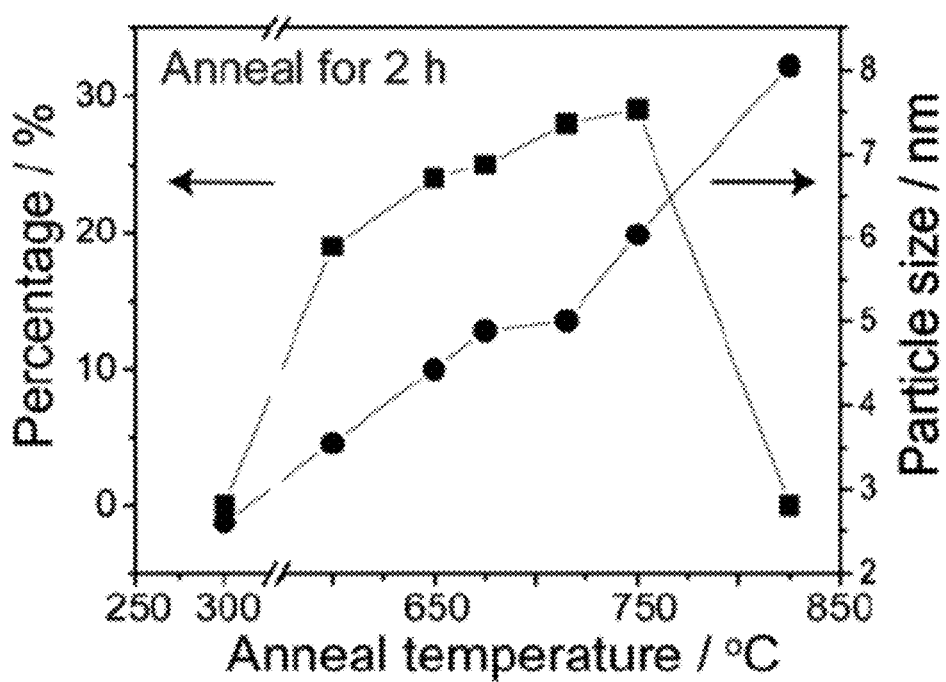
FIG. 3 shows a result of measuring degrees of ordering of atomic arrangement of the intermetallic catalysts prepared in an example and a comparative example.
Figure 4:
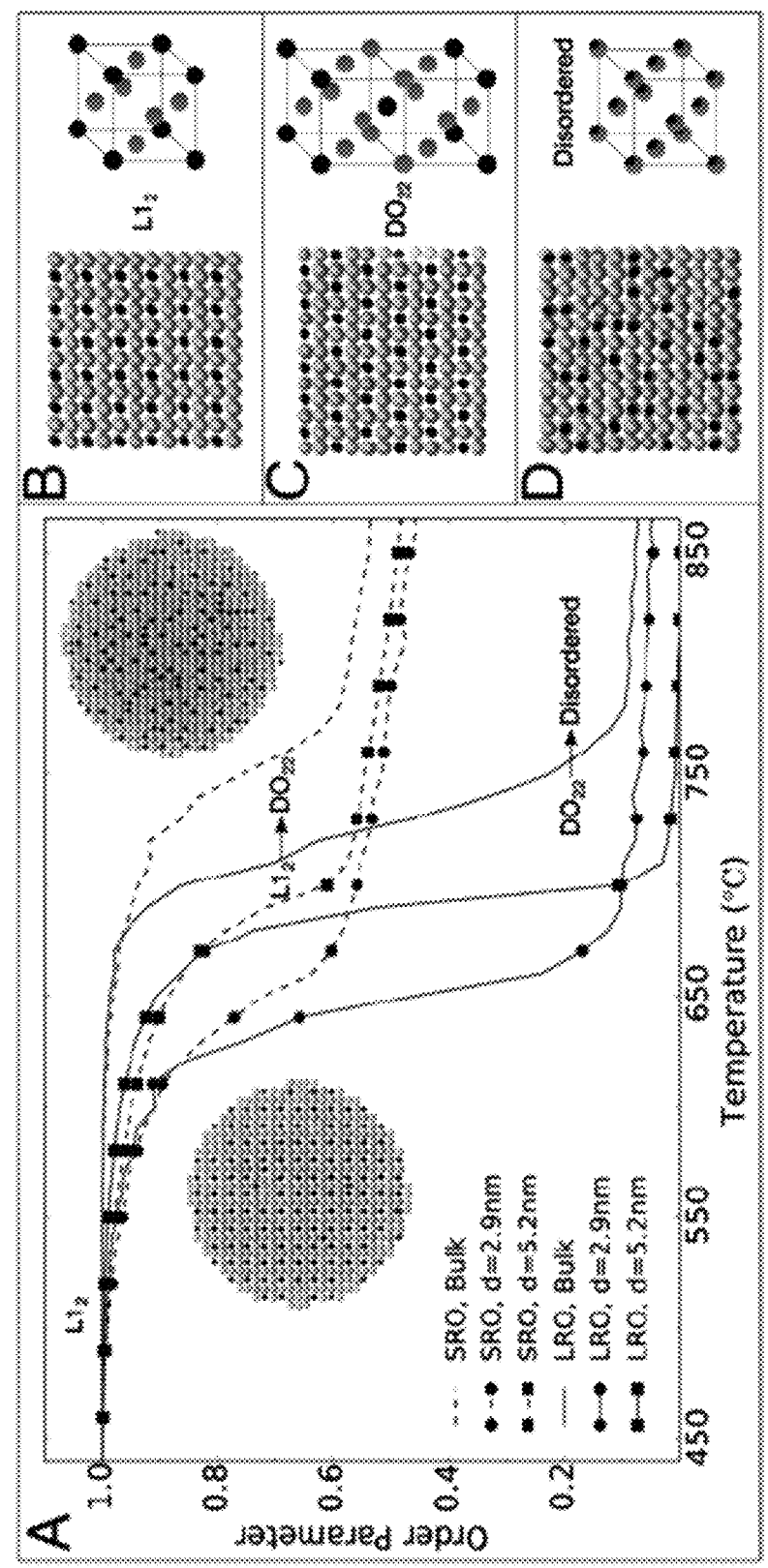
FIG. 4 shows a phase transition diagram of the intermetallic catalyst prepared in a comparative example.

Experimental Example 1: XRD Analysis According to Annealing Temperature of Intermetallic Catalyst Prepared in Comparative Example The intermetallic catalyst prepared in the comparative example was performed with an in-situ XRD analysis, and the results are shown in FIG. 2. In addition, a degree of ordering of the atomic arrangement of the intermetallic catalyst prepared in the example and comparative example was measured, and the results are shown in FIG. 3. FIG. 4 shows a phase transition diagram of the intermetallic catalyst prepared in the comparative example.

In a case of the comparative example, as the annealing gas directly transfers heat in a method that the intermetallic particles were prepared without introducing a coating layer for controlling a particle size, the effective heat transfer rate was very fast compared to the example.

As shown in FIG. 2, the intermetallic structure was maintained through the presence of a (110) crystalline plane peak at 32 degree up to a temperature of 750° C. in the XRD pattern while increasing a temperature, but the intermetallic structure was reformed to a disordered structure again at a temperature of 825° C.

As shown in FIG. 3, an intermetallic ratio was increased up to a temperature 750° C. in the comparative example and converged to 0 thereafter, wherein the intermetallic ratio was 30% at this time. In addition, even referring to a phase transition diagram of FIG. 4, the phase transition diagram from $L1_2$ (intermetallic) to $DO_{22}$ (disordered alloy) at a temperature of about 700° C. occurs during the theoretically verification based on 5.2 nm. On the other hand, the intermetallic ratio was continuously enhanced up to a temperature of 1200° C. and almost reached 99%.

Figure 5:
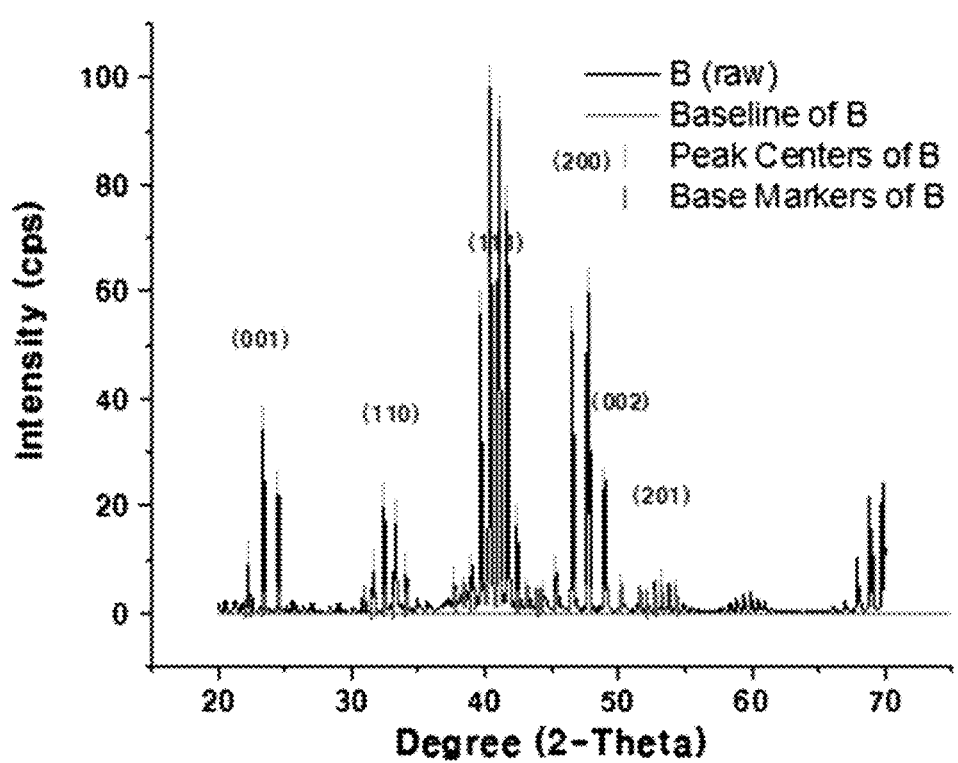
FIG. 5 shows an ideal XRD pattern of an intermetallic PtFe catalyst.

Experimental Example 2: XRD Analysis According to Time and Annealing Temperature of Intermetallic Catalyst Prepared in the Example FIG. 5 is a graph showing an ideal XRD pattern of an intermetallic PtFe catalyst having a size of 5.2 nm, and FIG. 6 is a graph showing a result of calculating an ideal degree of ordering of atomic arrangement of an intermetallic PtFe catalyst.

Figure 6:
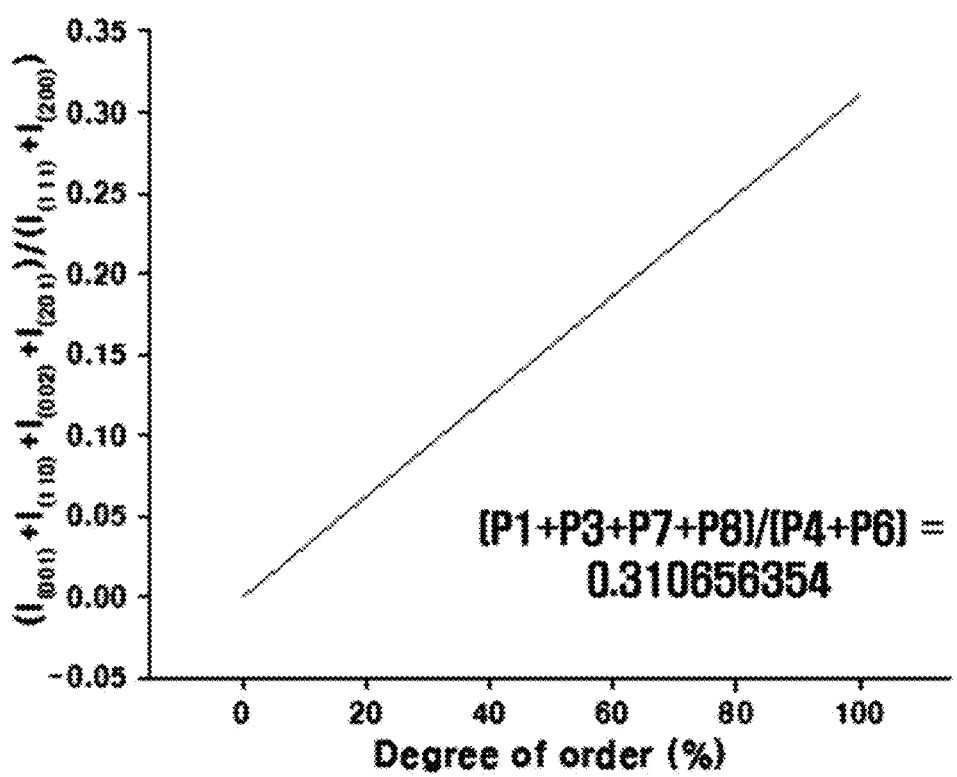
FIG. 6 shows results of calculating the ideal degree of ordering of an atomic arrangement of the intermetallic PtFe catalyst.

In FIGS. 6, P1, P3, P4, P6, P7, and P8 indicate intensities at predetermined peaks in the XRD pattern, and Table 1 shows what each peak means. The degree of ordering of the atomic arrangement of an intermetallic PtFe catalyst may be obtained by calculating (P1+P3+P7+P8)/(P4+P6), and as shown in FIG. 6, the ideal degree of ordering of atomic arrangement of the intermetallic PtFe catalyst is about 0.31. Accordingly, the degree of ordering of the atomic arrangement of the prepared intermetallic PtFe catalyst may be measured by XRD, calculating (P1+P3+P7+P8)/(P4+P6), and calculating a ratio to the ideal degree of ordering of the atomic arrangement.

TABLE 1

| Peak list | Peak index | Note |
|---|---|---|
| P1 | 001 | PtFe |
| P2 | 002 | C |
| P3 | 110 | PtFe |
| P4 | 111 | PtFe |
| P5 | 100 | C |
| P6 | 200 | PtFe |
| P7 | 002 | PtFe |
| P8 | 201 | PtFe |

Figure 7:
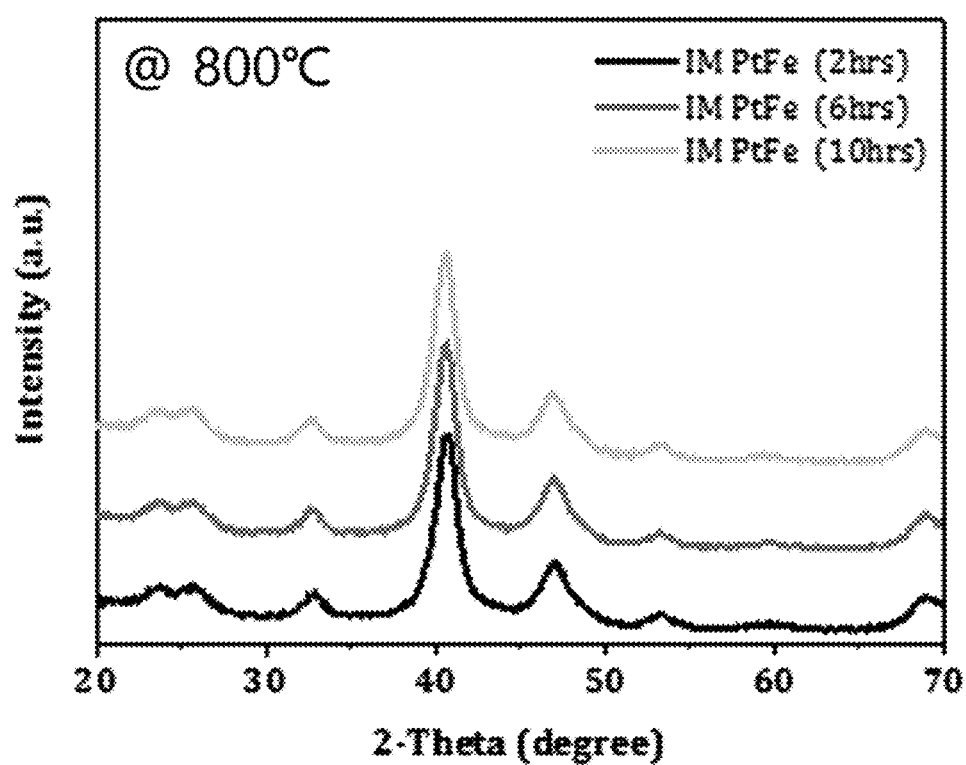
FIG. 7 shows in-situ XRD analysis results according to a change in annealing time in examples.
Figure 8:
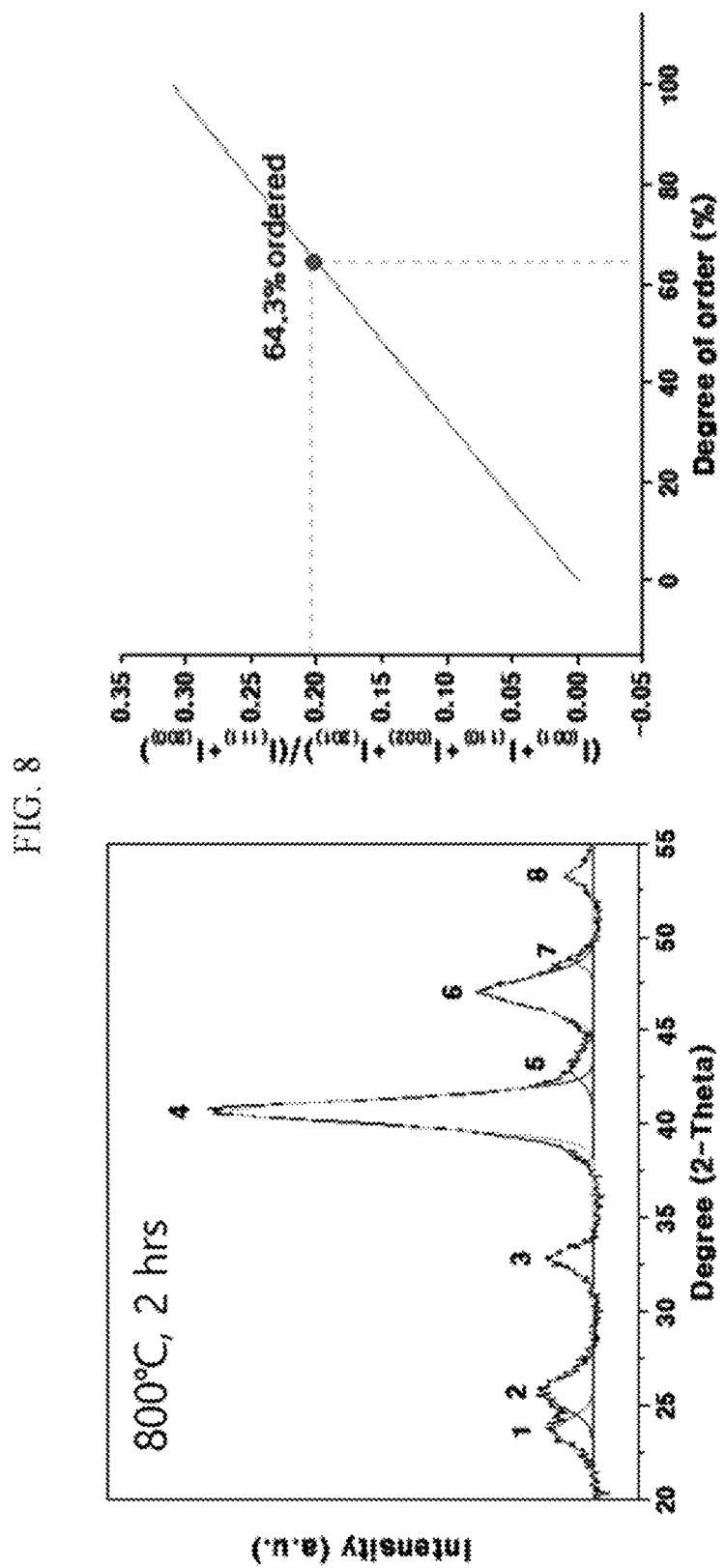
FIGS. 8 to 10 show XRD patterns and results of calculating degrees of ordering of atomic arrangements according to a change in annealing time in examples.
Figure 9:
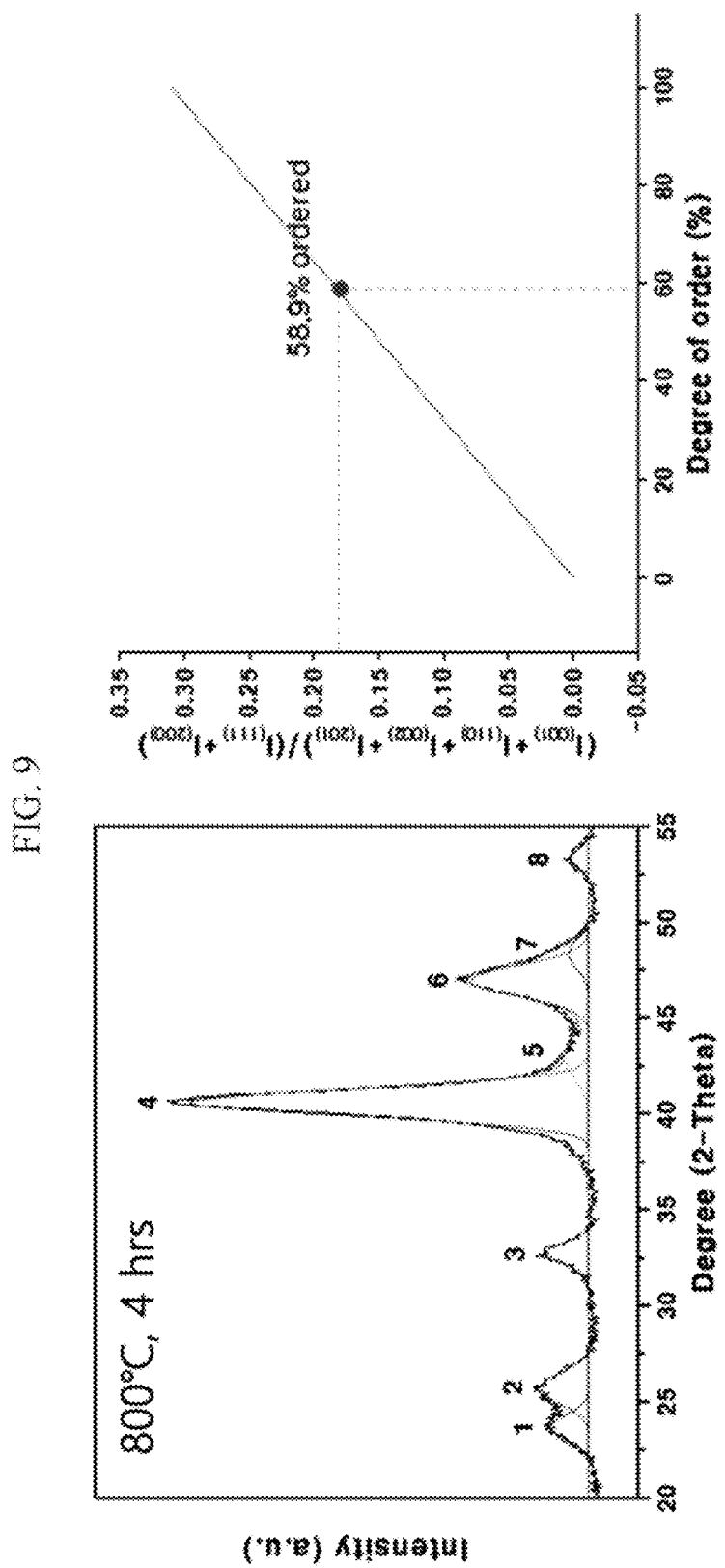
Figure 10:
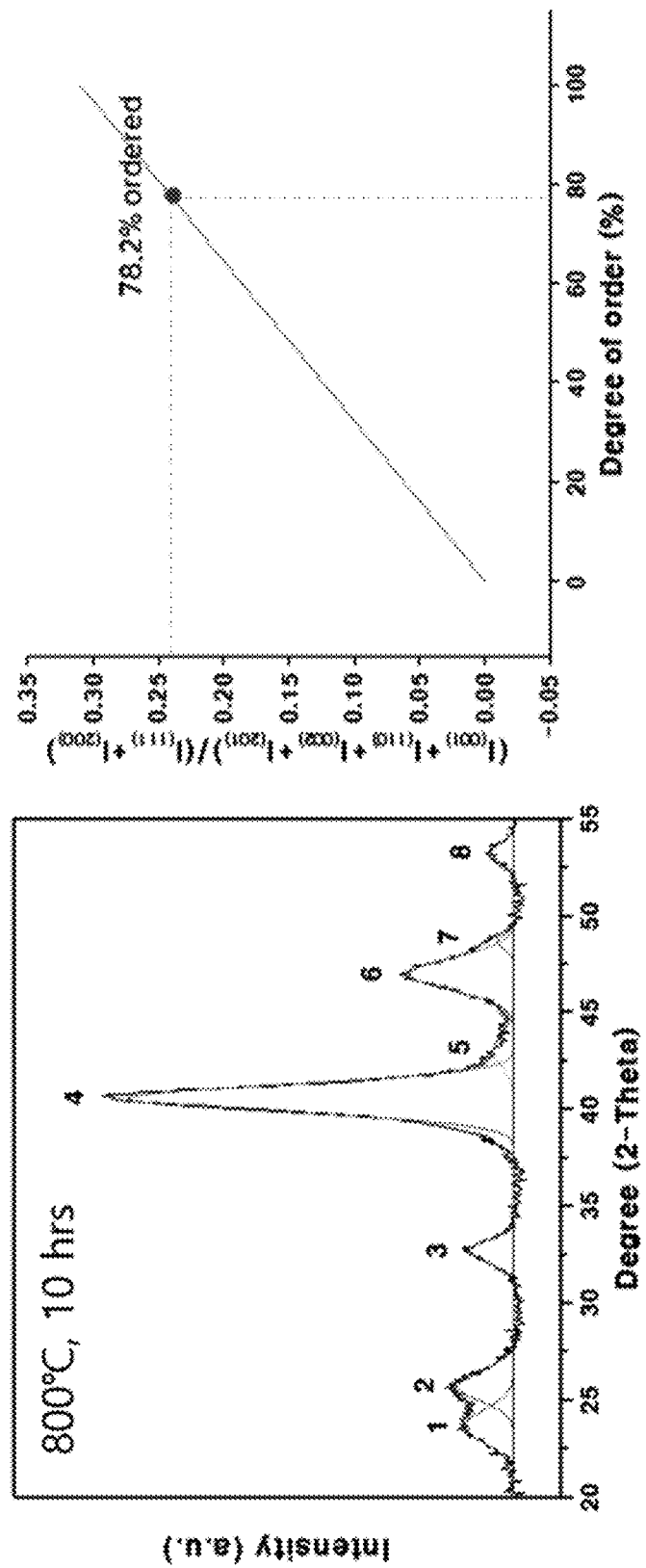

FIG. 7 shows the results of the in-situ XRD analysis while setting an annealing temperature of 800° C. and an annealing time for 2 hours, 6 hours, and 10 hours; and FIGS. 8 to 10 are graphs showing results of calculating the XRD pattern and the degree of ordering of the atomic arrangement for the cases of annealing times for 2 hours, 6 hours, and 10 hours, respectively, and Table 2 summarizes the results.

TABLE 2

| Annealing temperature | Annealing time | Degree of ordering of atomic arrangement (%) | |
|---|---|---|---|
| | | Example | Comparative Example |
| 800° C. | 2 hours | 64.3 | 31.5 |
| 800° C. | 4 hours | 58.9 | 28.9 |
| 800° C. | 10 hours | 78.1 | 38.3 |

Through FIGS. 7 to 10 and Table 2, in cases of the intermetallic PtFe catalyst obtained by changing a time (2 hours to 6 hours) for the same temperature condition (800° C.), the degree of ordering of the intermetallic atomic arrangement (IM DoO) is not significantly changed, and in the case of 10 hours, it is somewhat increased.

Figure 11:
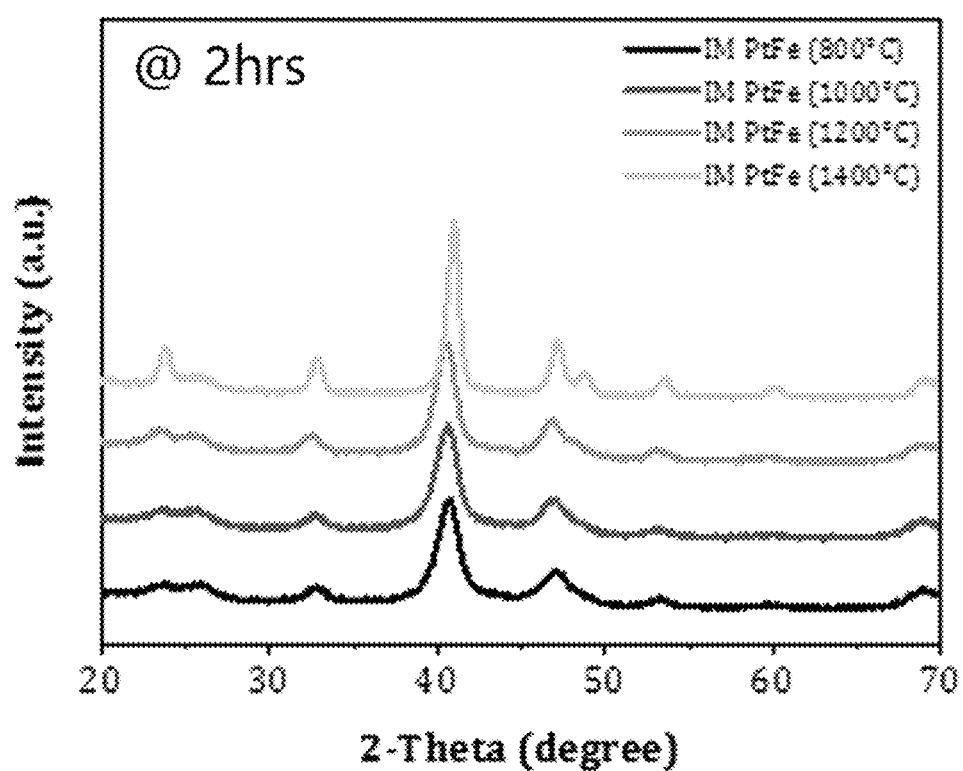
FIG. 11 shows in-situ XRD analysis results according to a change in annealing temperature in examples.
Figure 12:
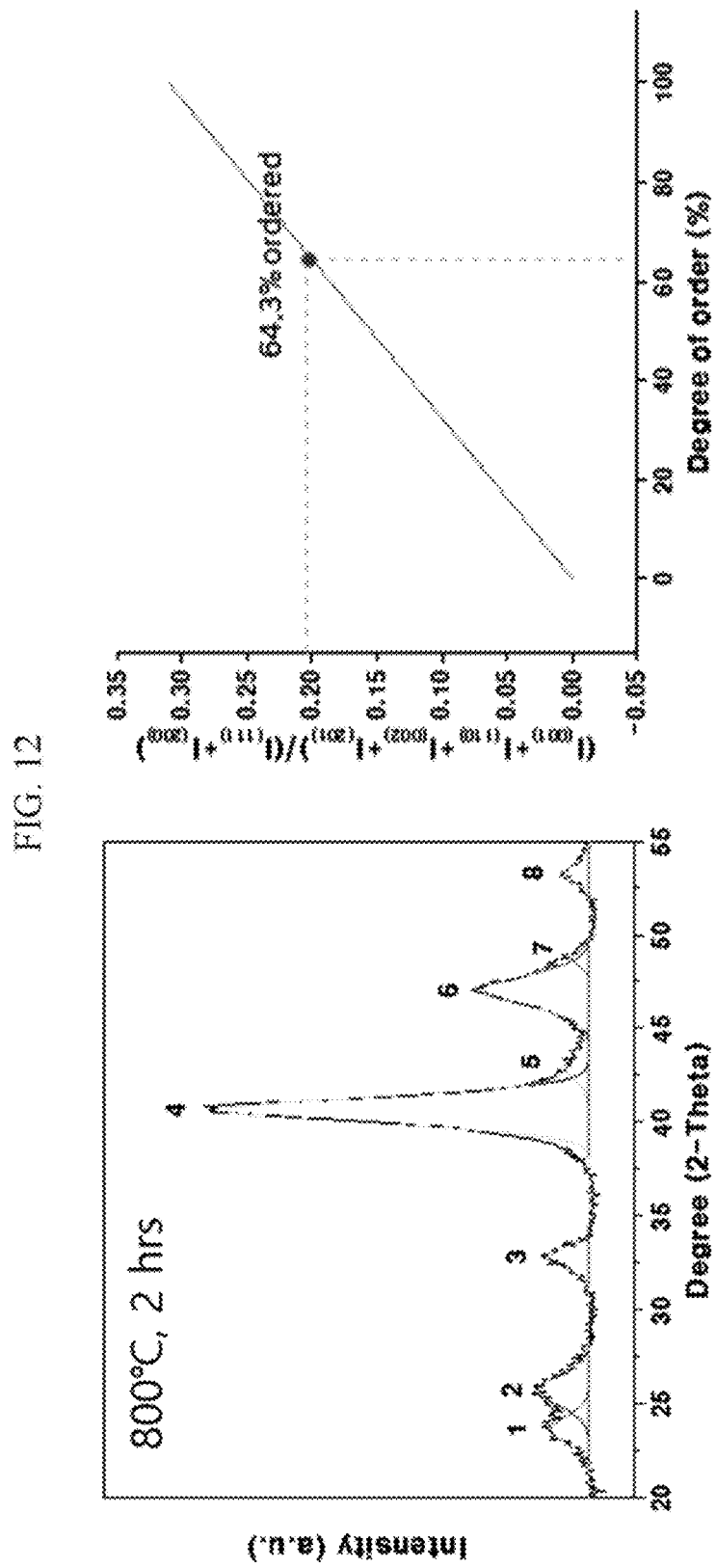
FIGS. 12 to 14 show XRD patterns and the results of calculating degrees of ordering of atomic arrangement according to a change in annealing temperature in examples.
Figure 13:
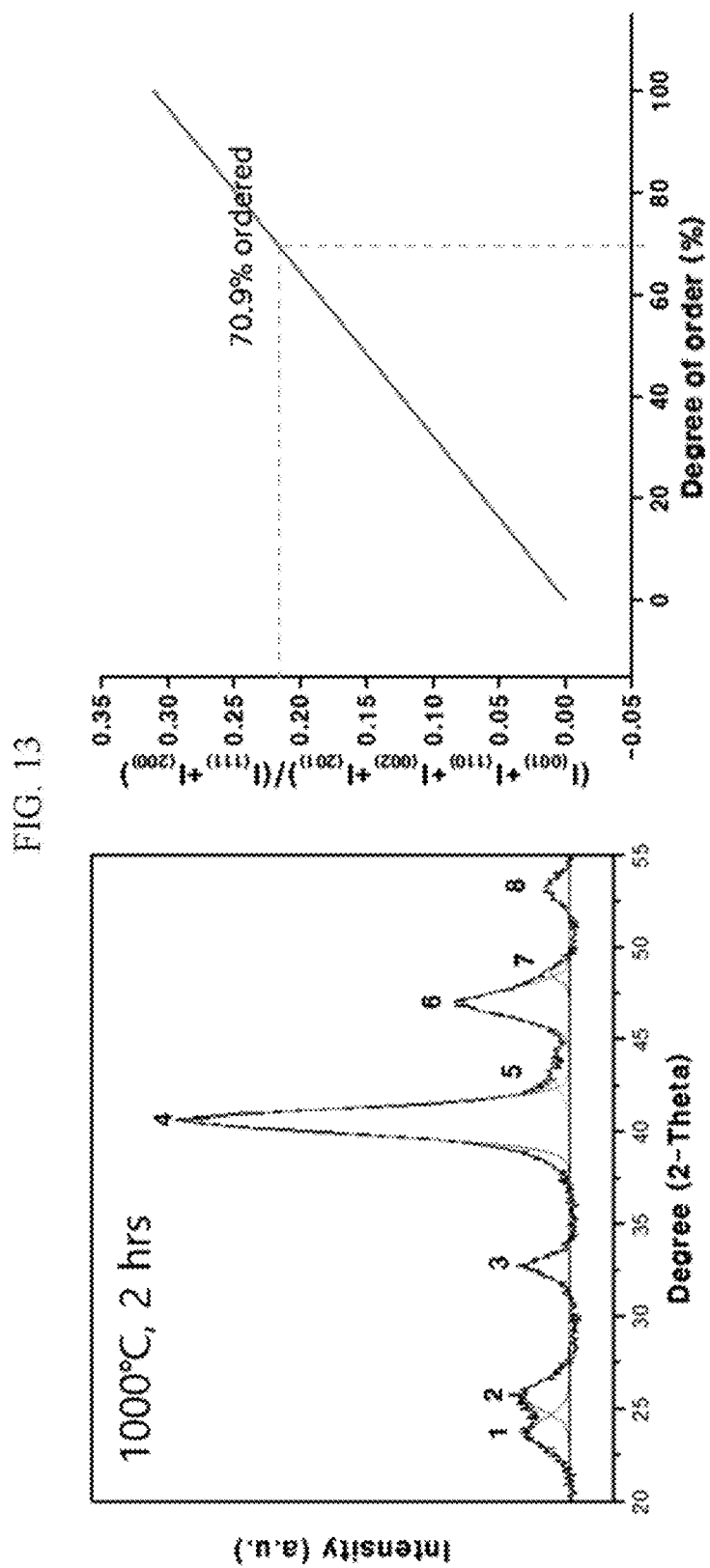
Figure 14:
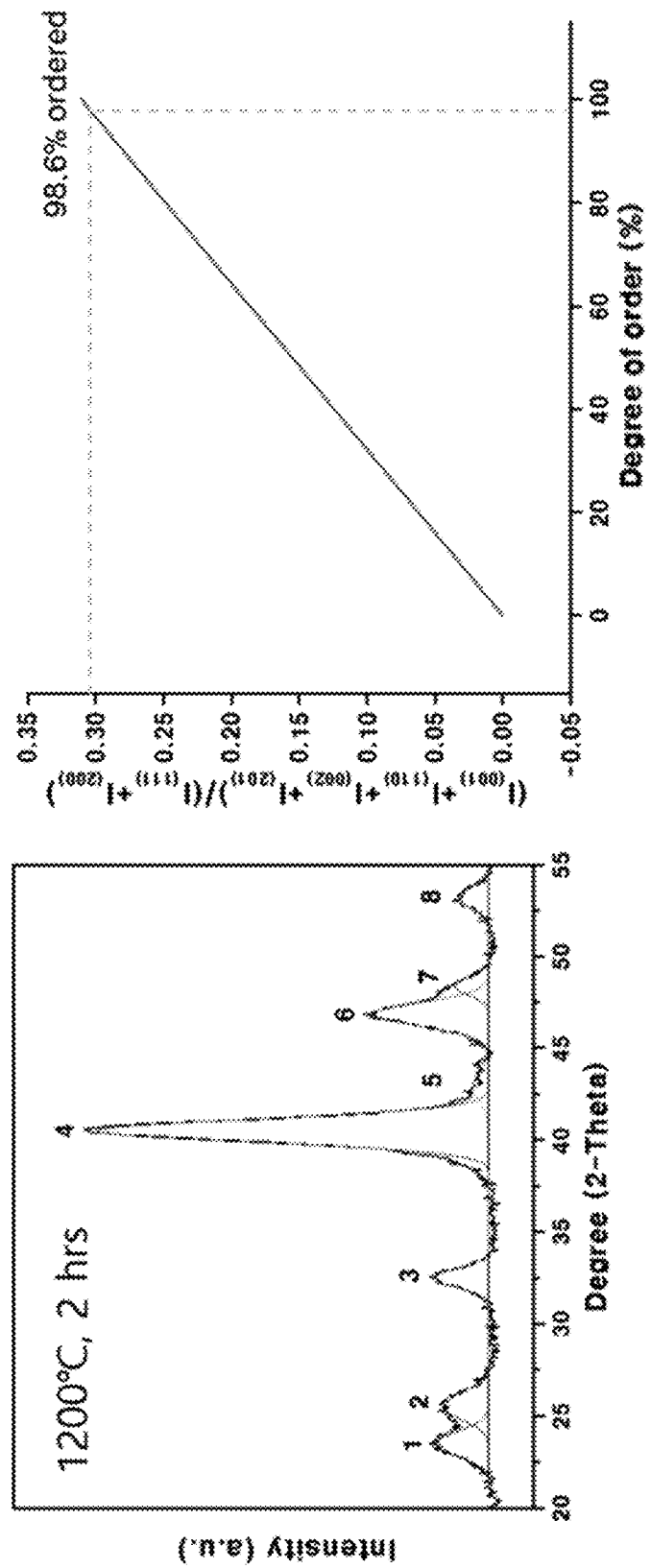

Meanwhile, FIG. 11 shows the in-situ XRD analysis results of the example while fixing the annealing time for 2 hours and changing the annealing temperature at 800° C., 1000° C., 1200° C., and 1400° C.; and FIGS. 12 to 14 are graphs showing the results of calculating the XRD pattern and the degree of ordering of the atomic arrangement when the annealing temperature was 800° C., 1000° C., and 1200° C., respectively, and Table 3 summarizes the results.

TABLE 3

| Annealing temperature | Annealing time | Degree of ordering of atomic arrangement (%) | |
|---|---|---|---|
| | | Example | Comparative Example |
| 800° C. | 2 hours | 64.3 | 31.5 |
| 1000° C. | 2 hours | 70.8 | 34.7 |
| 1200° C. | 2 hours | 98.6 | 48.3 |

As shown in FIGS. 11 to 14 and Table 3, in the case of the intermetallic PtFe catalyst obtained through the temperature change under the same annealing time condition (2 hours), the degree of ordering of the intermetallic atomic arrangement (IM DoO) was significantly changed according to the temperature.

Specifically, the sample performed with the annealing process at a temperature of 800° C. to 1200° C. increased the degree of ordering of the atomic arrangement in a particle size of about 5 nm, particularly, the case of the annealing process at a temperature of 1200° C., the degree of ordering of atomic arrangement reached about 99%. Meanwhile, when the annealing process was performed at a temperature of 1400° C., the particle size was enlarged to about 10 nm.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope greater than or equal to appended claims.

DESCRIPTION OF SYMBOLS

10: precursor mixture solution
20: core-shell particle
30: intermetallic catalyst
110: transition metal core
120: noble metal shell
130: intermetallic particle
150: transition metal oxide coating layer
210: intermetallic core
220: noble metal skin layer

What is claimed is:

1. A method of preparing an intermetallic catalyst, comprising:
    forming core-shell particles comprising a transition metal oxide coating layer;
    annealing the core-shell particles forming intermetallic particles comprising a transition metal oxide coating layer; and
    removing the transition metal oxide coating layer from the intermetallic particles,
    wherein the core-shell particles are formed by irradiating ultrasonic waves to a precursor mixture solution comprising a noble metal precursor, a transition metal precursor, and a carrier.

2. The method of claim 1, wherein the annealing is performed at a temperature of about 800° C. to about 1400° C.

3. The method of claim 1, wherein the annealing is performed for about 2 hours to about 10 hours.

4. The method of claim 1, wherein
    the core-shell particles comprises
    a transition metal core,
    a noble metal shell surrounding the transition metal core, and
    a transition metal oxide coating layer surrounding the noble metal shell.

5. The method of claim 1, wherein the transition metal oxide coating layer comprises $Fe_2O_3$.

6. The method of claim 1, wherein a thickness of the transition metal oxide coating layer is about 0.2 nm to about 0.88 nm.

7. The method of claim 1, wherein the irradiating of the ultrasonic waves is performed for about 20 minutes to about 4 hours at an output of about 125 W to about 200 W based on 100 mL of the precursor mixture solution.

8. The method of claim 1, wherein
    the intermetallic catalyst comprises:
    an intermetallic core of a transition metal and a noble metal, and
    a noble metal skin layer surrounding the intermetallic core.

9. The method of claim 8, wherein the intermetallic core has a degree of ordering of atomic arrangement of greater than or equal to about 58%.

10. A method of preparing an intermetallic catalyst of claim 1, wherein
    the annealing is performed under a mixed gas including hydrogen ($H_2$) and argon (Ar), and
    the mixed gas includes hydrogen ($H_2$) in an amount of about 1 volume % to about 10 volume % based on a total volume of the mixed gas.

11. The method of claim 1, wherein the removing of the transition metal oxide coating layer from the intermetallic particles is performed by acid treatment.

12. The method of claim 11, wherein the acid treatment is performed at a temperature of about 60° C. to about 94° C. for about 2 hours to about 4 hours.

13. The method of claim 11, wherein the acid used for the acid treatment includes $HClO_4$, $HNO_3$, HCl, or a combination thereof.

14. The method of claim 11, wherein a concentration of the acid is about 0.01 M to about 1.0 M.

* * * * *